Dec. 28, 1937.  W. LEUKERT  2,103,950
CONVERTING SYSTEM FOR REVERSIBLE ALTERNATING
CURRENT—DIRECT CURRENT CONVERSION
Filed Jan. 26, 1937

WITNESSES:

INVENTOR
Wilhelm Leukert.
BY
ATTORNEY

Patented Dec. 28, 1937

2,103,950

UNITED STATES PATENT OFFICE 2,103,950

CONVERTING SYSTEM FOR REVERSIBLE ALTERNATING CURRENT-DIRECT CURRENT CONVERSION

Wilhelm Leukert, Berlin-Siemensstadt, Germany, assignor to Westinghouse Electric & Manufacturing Company, East Pittsburgh, Pa., a corporation of Pennsylvania Application January 26, 1937, Serial No. 122,382
In Germany January 24, 1936

4 Claims. (Cl. 175—363)

My invention relates to converting systems for reversible alternating current-direct current conversion.

It is well known in the art to employ for the exchange of energy between an alternating-current supply circuit and a direct-current supply circuit and one or more direct-current consuming devices converting systems which operate with controllable electric discharge devices, such as grid-controlled mercury vapor discharge apparatus, and which consist of two groups of electric discharge devices, one of which operates as a rectifier, whereas the other as an inverted converter. Converting systems of this kind are frequently designated as "cross-connection". The electric discharge devices of both groups of the converting system must be so controlled that the voltage of the group operating as a rectifier is always greater than the voltage of the electric discharge devices operating as inverted converters, since otherwise a circular or compensating current may occur between both groups of electric discharge devices. Since the electric discharge devices operating as inverted converters cannot be for known reasons completely controlled particularly with regard to a reliable commutation the rectifier electric discharge devices must be operated with part control at maximum voltage of the converting system.

Figure 1:
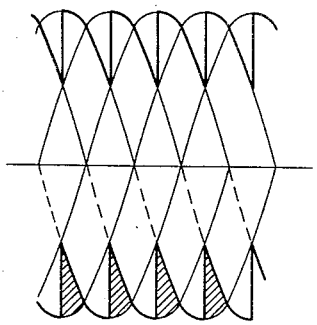
Figure 2:

Fig. 1 shows the usual graphical representation of the voltage in a converting system in cross-connection. The voltage curves above the zero line refer to the rectifier group, whereas the curves below the zero line to the inverter group. By the cross-hatched surfaces is indicated when voltages occur and the magnitude thereof which cause a flow of circular currents between both groups of electric discharge devices, these voltages being graphically represented in Fig. 2. Such voltages are always effective if the instantaneous value of the voltage applied to the rectifier electric discharge devices is greater than the instantaneous value of the inverter voltage. The circular currents caused by the differential voltages must be limited to an extent permissible for the operation of the electric discharge device by correspondingly dimensioning the reactors or also by a correspondingly impaired control.

The object of the invention is to provide a converting system in which the magnitude of the differential voltages and, therefore, also the magnitude of the circular currents are considerably reduced compared to the converting system hitherto known. According to the invention the alternating voltages of both groups of electric discharge devices and, therefore, the alternating voltages applied to the rectifier and the inverter are out of phase. According to the invention the two groups of electric discharge devices are no longer operated according to the diagram of Fig. 1 with co-phasal voltages, but the voltage curves are displaced with respect to one another by a certain amount, the phase displacement being so chosen as to cause differential voltages as small as possible and, therefore, circular currents as small as possible.

Figure 3:
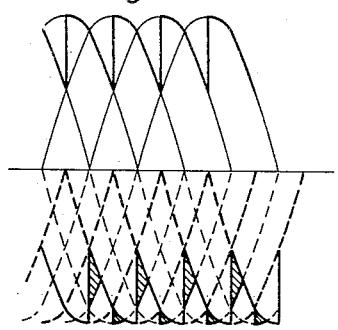
Figure 4:

In Fig. 3 is shown the diagram corresponding to Fig. 1 for the case that the voltages of the inverter electric discharge devices are 30° out of phase with respect to the voltages of the rectifier electric discharge devices. Also in this diagram are indicated as in the diagram of Fig. 1 the differential voltages by cross-hatched surfaces, these voltages being graphically represented in Fig. 4. The comparison between the diagrams of the Figs. 2 and 4 clearly shows that the differential voltages and the circular currents are considerably reduced by the invention.

Figure 5:
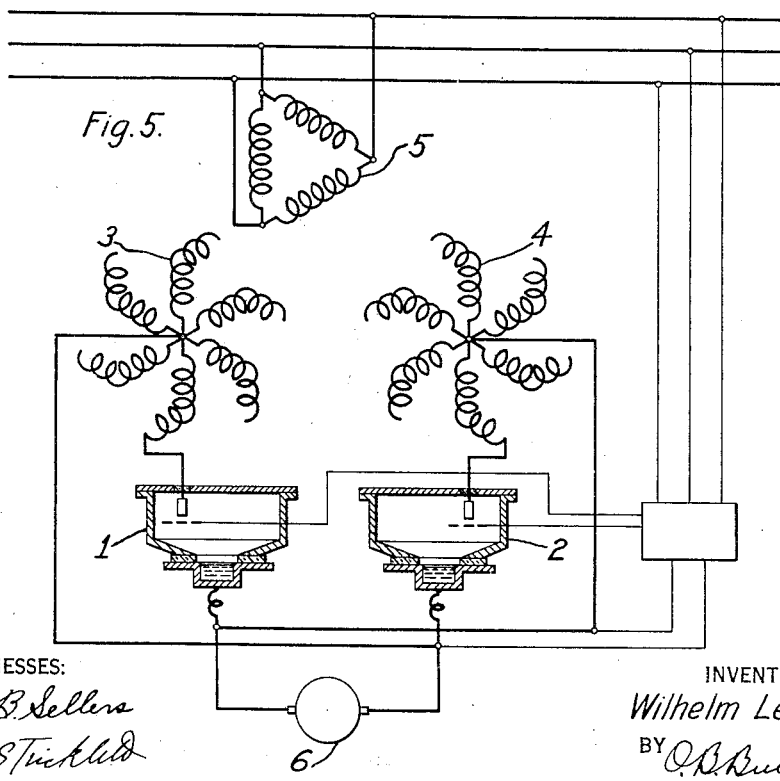

In Fig. 5 is shown a connection as an embodiment of my invention in which two six-phase discharge devices 1 and 2 are connected to the two secondary windings 3 and 4 of a transformer whose primary winding 5 is delta-connected to a three-phase current supply circuit. The cathodes of the two electric discharge devices are connected in a well-known manner to the neutral points of both secondary windings 3 and 4 of the transformer; between both cathodes is inserted a D. C.-motor 6 which is to be driven with regulable speed and direction of rotation through the converting system and which may supply energy back to the three-phase current supply circuit through the inverted converter.

As will be apparent from the wiring diagram both secondary windings 3 and 4 of the transformer are connected in zig-zag in such a manner that the resultant phase voltages are 30° out of phase. Consequently, the diagrams of Figs. 3 and 4 apply to the converting system in Fig. 5.

The alternating voltages applied to both groups of electric discharge devices may be also brought out of phase by other known means. A particular transformer may, for instance, be employed for either electric discharge device and the primary winding of one transformer may be star-connected, whereas the winding of the other transformer delta-connected.

As already mentioned it is possible by the invention to materially reduce the circular currents so that the cathode reactors may be designed with considerably smaller dimensions than those in the converting systems hitherto known. A further advantage of the invention consists in that the so-called control distance between the two groups of electric discharge devices may be decreased with the result that at a maximum rectifier voltage the electric discharge devices are so controlled as to correspond to a greater average D. C.-voltage. In this manner the electric discharge devices are better utilized and besides a better power factor of the system is attained.

The invention may also be used for other converting systems in which as in the case of the cross-connection the electric discharge devices are series-connected according to their converting effect. An example is the static frequency changer in which in the case of an equal connection alternating current is not converted to direct current but alternating current of one frequency is converted to alternating current of another frequency, particularly of a lower frequency.

I claim as my invention:

1. A reversible electric current converting system comprising an alternating current circuit, a regenerative load circuit, two cross-connected, grid controlled polyphase converters for controlling current flow between said circuits, transformer means for supplying energy to said converters, said transformer means being arranged to feed potential to one of said converters having a shifted phase angle with respect to the potentials supplied to the other.

2. A reversible electric current converting system comprising a supply circuit, a regenerative load circuit, two cross-connected groups of arc-discharge paths for transferring energy between said circuits, means for controlling the conductivity of said arc paths, transformer means for feeding potential to both of said groups of discharge paths, said transformer means being arranged to produce a shifted phase relation between the potentials applied to the respective groups of discharge paths.

3. A reversible electric current converting system comprising two multi-path, cross-connected converters, transformer means for feeding said converters, said transformer means supplying potentials to said converters having a relative phase displacement for minimizing the circulating current between said converters.

4. A converter system for transferring energy in either direction between an alternating current circuit and a direct current circuit comprising two groups of discharge paths, the cathode of one of said groups being connected to the positive side of the direct current circuit and the cathode of the other of said groups being connected to the negative side of said direct current circuit, transformer means including two electrically distinct secondary winding means for connecting said groups to the alternating current circuit, the phase relation of said secondary winding means being shifted with respect to each other to minimize the equalizing currents flowing between said groups of discharge paths.

WILHELM LEUKERT.